(12) United States Patent
Hasse

(10) Patent No.: US 9,715,471 B2
(45) Date of Patent: Jul. 25, 2017

(54) MASTER BUS DEVICE FOR A VEHICLE COMMUNICATION BUS OF A MOTOR VEHICLE

(71) Applicant: AUDI AG, Ingolstadt (DE)

(72) Inventor: Andre Hasse, Gachenbach (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/762,055

(22) PCT Filed: Jan. 24, 2014

(86) PCT No.: PCT/EP2014/000178
§ 371 (c)(1),
(2) Date: Jul. 20, 2015

(87) PCT Pub. No.: WO2014/124731
PCT Pub. Date: Aug. 21, 2014

(65) Prior Publication Data
US 2015/0356043 A1 Dec. 10, 2015

(30) Foreign Application Priority Data
Feb. 15, 2013 (DE) .......... 10 2013 002 648

(51) Int. Cl.
*G06F 13/00* (2006.01)
*G06F 13/40* (2006.01)
(Continued)

(52) U.S. Cl.
CPC ........ *G06F 13/4022* (2013.01); *G06F 13/364* (2013.01); *H04L 12/4015* (2013.01);
(Continued)

(58) Field of Classification Search
CPC ............... G06F 13/4022; G06F 13/364; H04L 12/40019; H04L 12/4015
(Continued)

(56) References Cited

U.S. PATENT DOCUMENTS 4,142,493 A * 3/1979 Schira ................ F02D 41/0077
123/486
5,506,844 A * 4/1996 Rao ....................... H04J 3/1688
370/468
(Continued)

FOREIGN PATENT DOCUMENTS

DE 19939568 2/2001
DE 102004026994 12/2005
(Continued)

OTHER PUBLICATIONS

LIN Specification Package Revision 2.2A Dec. 31, 2010.*
(Continued)

*Primary Examiner* — Paul R Myers
(74) *Attorney, Agent, or Firm* — Staas & Halsey LLP

(57) ABSTRACT

A master bus device for a motor vehicle exchanges messages with slave bus devices via a vehicle communication bus of the motor vehicle. It is specified in the master bus device by an operating schedule which is stored in a memory of the master bus device which messages the master bus device exchanges with the slave bus devices. To utilize the vehicle communication bus more efficiently, the master bus device has a switch-over device which is designed to receive a control signal from a device-external transmitting device and, in dependence on the control signal, to switch from the memory with the operating schedule to a further memory with a maintenance schedule which differs from the operating schedule, so that the maintenance schedule is used after switching over, for exchanging messages.

21 Claims, 1 Drawing Sheet

(51) Int. Cl.
  *G06F 13/364* (2006.01)
  *H04L 12/40* (2006.01)
(52) U.S. Cl.
  CPC .......... *H04L 12/40019* (2013.01); *H04L 2012/40234* (2013.01); *H04L 2012/40273* (2013.01)
(58) Field of Classification Search
  USPC .......................................................... 710/110
  See application file for complete search history.

(56) References Cited

U.S. PATENT DOCUMENTS

| | | | | |
|---|---|---|---|---|
| 5,808,375 | A * | 9/1998 | Armbruster | B60R 16/0234 180/287 |
| 5,854,978 | A * | 12/1998 | Heidari | H04W 4/24 455/403 |
| 6,385,198 | B1 * | 5/2002 | Ofek | H04L 12/5695 370/389 |
| 6,665,601 | B1 | 12/2003 | Nielsen | |
| 7,218,637 | B1 * | 5/2007 | Best | H04L 49/254 370/395.4 |
| 7,272,309 | B1 * | 9/2007 | Tamil | H04L 45/62 370/351 |
| 8,209,076 | B2 * | 6/2012 | Boss | G06Q 10/20 340/568.1 |
| 9,092,307 | B2 * | 7/2015 | Langer | G06F 11/00 |
| 2002/0091838 | A1 | 7/2002 | Rupp et al. | |
| 2003/0131171 | A1 | 7/2003 | Weigl et al. | |
| 2005/0002500 | A1 * | 1/2005 | Kumai | H04M 1/006 379/88.17 |
| 2008/0189464 | A1 | 8/2008 | Bohme et al. | |
| 2008/0304499 | A1 * | 12/2008 | Jeon | H04L 12/66 370/401 |
| 2009/0307400 | A1 | 12/2009 | Machauer et al. | |
| 2011/0286096 | A1 * | 11/2011 | Dykhouse | G02B 7/1815 359/512 |
| 2013/0027080 | A1 * | 1/2013 | Sugiyama | H03K 19/17756 326/41 |
| 2013/0117483 | A1 * | 5/2013 | Boeck | H04L 12/4035 710/110 |
| 2013/0332637 | A1 | 12/2013 | Milbredt et al. | |
| 2014/0297913 | A1 * | 10/2014 | Odenbreit | H04L 12/40202 710/110 |
| 2015/0051938 | A1 * | 2/2015 | Li | G06Q 10/06314 705/7.24 |

FOREIGN PATENT DOCUMENTS

| | | |
|---|---|---|
| DE | 102006032217 | 1/2008 |
| DE | 102010023071 | 4/2011 |
| DE | 102010040785 | 3/2012 |
| DE | 102011012572 | 3/2012 |
| EP | 2421204 | 2/2012 |
| WO | 01/50677 | 7/2001 |
| WO | 2006/128396 | 12/2006 |

OTHER PUBLICATIONS

WIPO English language translation of the International Preliminary Report on Patentability for PCT/EP2014/000178, downloaded from WIPO website Oct. 16, 2015.
German Office Action for German Priority Patent Application No. 10 2013 002 648.2, issued Oct. 14, 2013, 7 pages.
German Notice of Allowance for German Priority Patent Application No. 10 2013 002 648.2, issued Feb. 4, 2014, 5 pages.
English Language International Search Report for PCT/EP2014/000178, mailed on Apr. 14, 2014, 2 pages.

* cited by examiner

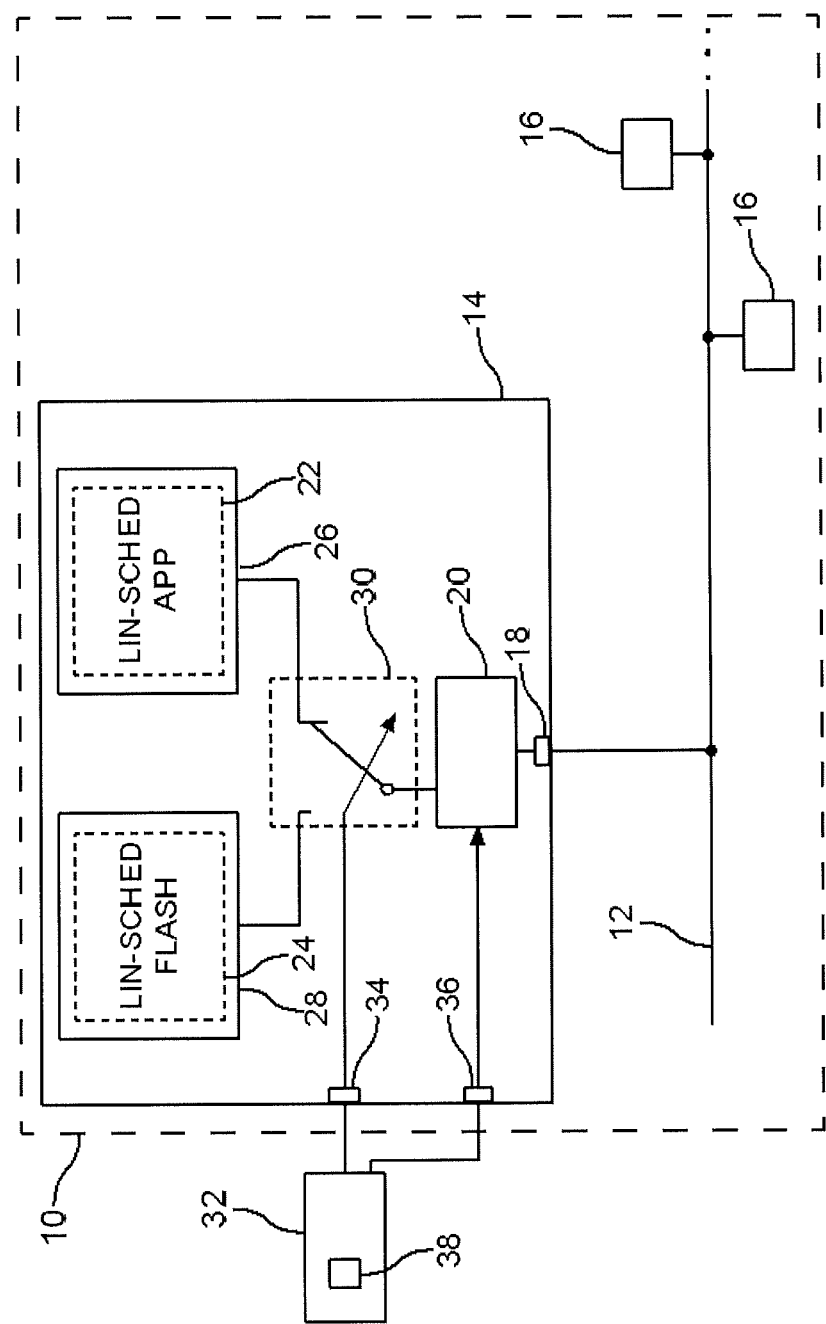

MASTER BUS DEVICE FOR A VEHICLE COMMUNICATION BUS OF A MOTOR VEHICLE

CROSS REFERENCE TO RELATED APPLICATIONS

This application is based on and hereby claims priority to International Application No. PCT/EP2014/000178 filed on Jan. 24, 2014 and German Application No. 10 2013 002 648.2 filed on Feb. 15, 2013, the contents of which are hereby incorporated by reference.

BACKGROUND

The invention relates to a master bus device for a motor vehicle which is designed for exchanging messages with slave bus devices via a vehicle communication bus of the motor vehicle. The invention also includes a motor vehicle and a method for operating a master bus device.

An LIN bus (LIN—Local Interconnect Network) may be used as the master bus device. In an LIN bus, messages are sent out in a predetermined sequence in predetermined time slots by the master bus device to the remaining bus users, that is to say the slave bus devices. The message type is also specified. Message type means here that a message is sent to a quite particular addressee with a quite particular request, that is to say, e.g., the request: transmitting or receiving data of a particular type, that is to say, e.g., the current temperature. The default settings relating to the transmitting times and the message type are obtained from a schedule which is stored in a memory of the master bus device. The schedule is processed cyclically by a master bus device, i.e. after the end of the schedule, the master bus device starts again from the beginning in the schedule.

The schedule must be specified at the time of development of the master bus device and stored in the memory. In this context, it must take into consideration all situations which may occur in a motor vehicle in the course of its operation. In normal operation of the motor vehicle, when a driver uses the motor vehicle in order to travel with it, for example, the master bus device exchanges messages with the slave bus devices relating to the operation of the motor vehicle. If a slave bus device is, for example, a sensor, sensor data can be transmitted from the slave bus device to the master bus device by corresponding messages. If the slave bus device is an actuator, that is to say, for example, a control device with a motor connected thereto for, for example, a sliding roof, a control command for activating can be transmitted by the master bus device by a corresponding message. Apart from such messages for normal operation, however, it must also be possible for maintenance work that the master bus device can exchange messages with the slave bus devices for the diagnosis or reconfiguring of the slave bus devices. In the schedule of the master bus device, some transmitting times or time slots must be reserved therefore in the schedule for such diagnostic communication with the slave bus device. These time slots are then not utilized in normal operation, i.e. the master bus device has here in each case a transmission interval in normal operation of the motor vehicle. It is only during maintenance work in a workshop that it may occur that the master bus device uses the time slot for the diagnostic communication. As a rule, however, the remaining time slots are then unused for exchanging the measurement data and control data.

The ratio of messages for the normal operation to messages for, for example, diagnostic communication, is a question of the calibration. As a rule, a schedule contains only one to two time slots for diagnostic communication. In a normal case there are two time slots, one for sending out the diagnostic inquiry and one for receiving the diagnostic response. A much larger number, typically 20 to 30, is provided for normal operation. During a workshop stay or during the development of a motor vehicle, it may occur, however, that very large volumes of data are to be transmitted from the master bus device to the slave bus device during a maintenance of a slave bus device. This may be the case, for example, during the reprogramming of a control device which is operated as slave bus device. Since only the few time slots for messages of diagnostic communication are available for this purpose, the transmission of such volumes of data can take a very long time. It is only possible to use the correspondingly reserved time slots for transmitting corresponding LIN messages. As a rule, such an LIN message is 8 bytes long, i.e. 8 bytes of the record to be transmitted can only be transmitted twice in the said example per cycle of the schedule. If the record is, e.g., new operating software for a control device, such reprogramming can take an undesirably long time. In this case, even several kilobytes must often be transmitted, e.g., 15000 bytes.

From DE 10 2006 032 217 A1, a method for operating an LIN bus is known in which an alternative communication protocol is tunneled through the LIN protocol. In this manner, sections of a data stream which, according to a diagnosis protocol, must be transmitted during a diagnostic session via the vehicle communication bus, can be transported in each case in LIN messages.

SUMMARY

One possible object relates to utilizing a vehicle communication bus more efficiently by a schedule-controlled master bus device.

The inventor proposes a master bus device for a motor vehicle which is designed for exchanging messages with slave bus devices via a vehicle communication bus of the motor vehicle. In the master bus device, it is specified in the familiar manner by an operating schedule which messages the master bus device exchanges with the slave bus devices. For this purpose, the operating schedule is stored in a memory of the master bus device. The master bus device is, in particular, a master bus device for an LIN bus, i.e. the messages exchanged via the LIN bus are then LIN messages as are known from the related art from the LIN standard per se.

In order to then provide for a more efficient utilization of the vehicle communication bus, the proposed master bus device has a further memory for storing a further schedule and a switch-over device. In the further memory, a maintenance schedule is stored which differs from the operating schedule. The switch-over device is designed for switching from the operating schedule to the maintenance schedule so that, after the switch-over, the maintenance schedule is used during the exchanging of messages.

In this context, the switch-over takes place in dependence on a control signal which is received by the master bus device from another device, for example a diagnostic device which is connected to the motor vehicle in a workshop. In the text which follows, this further device will be called device-external transmitting device since it is located outside the master bus device.

The proposed method correspondingly specifies the operation of a master bus device. In this context, messages are exchanged with slave bus devices on the basis of an operating schedule in an application mode of the master bus device. If a control signal is received from the device-external transmitting device by the master bus device, a wait mode is adopted in which the operating schedule is deactivated and the maintenance schedule is activated and the master bus device thus exchanges messages with the slave bus devices on the basis of the maintenance schedule.

The proposals result in the advantage that, if necessary, large volumes of data can be transmitted rapidly via the communication bus to a particular slave bus device, e.g. for reprogramming, whilst in contrast, in normal operation of a motor vehicle, many individual control devices operated as slave bus devices can be addressed within short time intervals one after the other. For this purpose, it is merely necessary to provide correspondingly two schedules, one for the normal operation for exchanging many different messages in short time intervals and one for the maintenance for exchanging the large volume of data, i.e. for a unidirectional transmission to a particular slave bus device.

In conjunction with this discussion, the term schedule generally means a record which prescribes which messages (message type) the master bus device exchanges with slave bus devices via the vehicle communication bus. Exchanging in this case is meant to mean that the master bus device either receives data from the slave bus devices or sends data to these. In this context, the message type specifies the addressee or the group of addressees and the data content to be exchanged for the respective message. If the messages are those for reading out data from the slave bus devices, this can be effected in accordance with the LIN standard.

The operating and the maintenance schedule preferably also fix the sequence of the messages to be exchanged and the respective time for sending out the corresponding message (time slot classification), that is to say, the currently active schedule provides the master bus device with clocking for sending out the messages or, in other words, the time slots for sending out the messages.

Depending on the data content read out or sent, this is an application message for the normal operation of the motor vehicle or a diagnostic or configuration message for the maintenance of one or more of the slave bus devices. The messages for the normal operation can be combined in the operating schedule and the message for the maintenance and configuration operation can be combined in the maintenance schedule.

Correspondingly, the operating schedule is thus designed preferably for the normal operation of the motor vehicle, that is to say the operation during which a driver uses the motor vehicle. In this context, the operating schedule then specifies preferably completely, but at least largely only messages relating to the operation of the motor vehicle during normal operation, that is to say those messages which exclusively relate to the reading out of sensor data or the transmitting of control commands for the operation. This results in the advantage that no or at least fewer time slots need to be provided for the diagnostic communication in the operating schedule.

This is because messages of a message type for the diagnostic communication are combined preferably in the maintenance schedule which is designed for a maintenance operation of the motor vehicle, i.e. an operation in which at least one slave bus device is modified for maintenance or further development or during its production. The maintenance schedule then has at least predominantly but preferably completely only messages for a diagnosis and/or a data transmission of configuration data and/or operating software at at least one of the slave bus devices. The said configuration data differ from the control data provided for the normal operation in that they compromise parameter values for the configuring of operating software whilst the control data cause the activating of functionalities of a control device.

The maintenance schedule described has the advantage that it can be devoted exclusively to the transmission of those data which are necessary during the maintenance of a motor vehicle or a reconfiguration as part of a vehicle development or during the manufacture of a motor vehicle. This significantly accelerates the maintenance work since a large proportion of the time slots of a cycle in the schedule is devoted to this communication.

In order to be able to advantageously specify flexibly which data are transmitted in the maintenance mode (i.e. when the maintenance schedule is active), a further development of the master bus device provides to receive the record via a data input from a device-external data source, for example a programming device which has been connected to the motor vehicle in a workshop. The record can be, for example, exchange software for eliminating faults in software of a slave bus device.

In order to transmit such a relatively large record particularly efficiently via the vehicle communication bus from the master bus device to the slave bus device, a development of the master bus device provides that the maintenance schedule provides messages for transmitting the record by a predetermined transport protocol. Preferably, messages for a transport protocol according to the ISO standard 15765-2 are specified in this case. In particular, the maintenance schedule is designed for using a predominant part of or all time slots of a cycle of the schedule for the transmission of the record.

A further advantage is obtained if the possibility is created to use even different maintenance schedules and by this, to be able to use a correspondingly adapted maintenance schedule for different maintenance scenarios. A corresponding development of the master bus device comprises a receiving device for receiving a new maintenance schedule from a device-external transmitting device and for storing the received new maintenance schedule in the memory for the maintenance schedule. However, the maintenance schedule should be stored permanently in the master preferably at the time of development. It is then only necessary to switch between the schedules by a control signal.

Another development of the master bus device also provides here to provide at least one further memory with in each case one further maintenance schedule in the master bus device, the switch-over device then being designed for switching to one of the several maintenance schedules then available, in dependence on the control signal described. This development has the advantage that several maintenance schedules optimized for different situations can be provided already during the production of the master bus device.

Hitherto, it has only been described how switching from the operating schedule to a maintenance schedule is effected in dependence on the control signal. According to one embodiment of the master bus device, it is naturally also provided correspondingly to switch back to the operating schedule in dependence on a further control signal so that the operating schedule is effective again in the master bus device. Additionally or as an alternative, it is provided according to a further embodiment of the master bus device to switch back from the maintenance schedule to the operating schedule during a transgression of time. Thus, a period which has elapsed since the switch-over to the maintenance schedule is detected and then the system is switched back to the operating schedule if the detected period is greater than a predetermined threshold value. The threshold value can have a value of between 0.5 seconds and 20 seconds, for example.

As already stated, the inventor also proposes a motor vehicle. The motor vehicle has a vehicle communication bus to which the proposed master bus device is connected.

Finally, it should be mentioned that the proposed method includes embodiments which have already been described in conjunction with the proposed master bus device. For this reason, the corresponding developments of the method will not be described here again.

BRIEF DESCRIPTION OF THE DRAWINGS

These and other objects and advantages of the present invention will become more apparent and more readily appreciated from the following description of the preferred embodiments, taken in conjunction with the accompanying drawings of which:

The FIGURE shows a motor vehicle 10 in a diagrammatic representation which can be, for example, a passenger car.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

The motor vehicle 10 has a vehicle communication bus 12 which can be, for example, an LIN bus via which messages are transmitted in accordance with the LIN standard (as so-called LIN messages). The communication on the vehicle communication bus, briefly bus 12 in the text which follows, is controlled by a master bus device or briefly bus master 14 in the motor vehicle 10. The bus master 14 here exchanges the messages with slave bus devices or briefly slave devices 16. For this purpose, the devices are all connected to the bus 12. In the FIGURE, only two slave devices 16 are shown, but more slave devices or also only one slave device can be connected. A slave device 16 can be, for example, a circuit with a sensor, for example a temperature sensor, or an actuator, for example a motor controller for a window lifter. However, a slave device 16 can also be a control device having its own operating software.

The bus master 14 is connected to the bus 12 via a bus connection 18. The messages which the bus master 14 exchanges with the slave devices 16 via the bus 12 can be generated by a control device 20 of the bus master 14. The control device 20 can be, for example, a microcontroller. A message can be a transmit message here by which the bus master 14 transmits data to one or more of the slave devices 16. A message can also be a read message by which the bus master 14 causes one or more of the slave devices 16 to send data via the bus 12 to the bus master 14.

The bus master 14 exchanges cyclically repeatedly messages of the same type in a predetermined order and at predetermined times with the slave devices 16. If a message of a particular type must be sent at a particular time or time window (also called time slot), but there are no data for this event, a transmission interval occurs on the bus 12. For example, a slave device with a temperature sensor can thus be requested by the bus master 14 cyclically repeatedly at quite particular times to send a current temperature value to the bus master 14.

Which messages must be output when by the control unit 20 at the bus terminal 18 is specified by a schedule. The bus device 14 has two schedules, namely an operating schedule 22 and a maintenance schedule 24. The operating schedule 22 is designed for an application mode of the master device 14 and specifies an order and clocking (transmit time slots) for messages as they are suitable for exchanging the sensor data or control data with the slave devices 16 in normal operation of the motor vehicle, that is to say, for example, during a trip, as is required for a smooth operation of the motor vehicle 10. In this context, the operating schedule 22 can be optimized in such a manner that no messages whatsoever, i.e. no time slots whatsoever, are reserved for such messages which do not need to be exchanged during the normal operation of the motor vehicle, that is to say, for example, diagnostic messages or configuration messages for adjusting the operating characteristic of the slave devices 16.

For the purpose, the maintenance schedule 24 can be provided which can exhibit a correspondingly large number and dense sequence of messages for the maintenance and configuration of the slave devices 16. The maintenance schedule 24 can be optimized in such a manner that it is suitable exclusively for maintenance and reconfiguration. In other words an operation of the slave devices 16 would be impossible or at least impaired during a trip of the motor vehicle 10 by using the maintenance schedule 24.

The operating schedule 22 and the maintenance schedule 24 are in each case stored in a memory 26, 28. The memories 26, 28 can for example also be different memory areas of a single non-volatile memory, for example of a flash memory, EEPROM or of a hard disk. The control device 20 is coupled to the memories 26, 28 via a switching device 30. The switching device 30 can also be a component of the microcontroller mentioned. The switching device 30 can be, for example, a program module in an operating program of the microcontroller.

For the further explanation of the exemplary embodiment it shall be assumed that the motor vehicle 10 has been brought into a workshop in order to have the operation of the slave devices 16 checked or reset. For example, a driver of the motor vehicle 10 may have found that he has problems with the operation of one of the slave devices 16, for example the operation of a control device for a sliding roof. The motor vehicle 10 can also be a prototype which is in development. In order to then improve, for example, control programs of the slave devices 16 for everyday suitability, the motor vehicle 10 is brought regularly into the workshop after test drives in order to reprogram the slave devices 16.

In the workshop, a vehicle-external control device 32 can be connected to a control interface 34 and a data input 36 of the bus master 14. The control device 32 is a transmitting device which, via the control interface 34, can switch the switching device 30 by a control signal so that it is no longer the operating schedule 32 which is active for the specification of the messages generated by the control device 20 but the maintenance schedule 24. The control device 32 can be, for example, a test device for motor vehicle diagnoses and does not need to be connected to the bus 12.

For the example, it shall be assumed that by the control device 32, new operating software 38 for one of the slave devices 16 is to be transmitted via the bus master 14 and the bus 12 to the slave device 16 and is to be written into a memory there. This process is also called flashing. Operating the bus master 14 on the basis of the maintenance schedule 24 provides a communication channel for the control device 32 to the slave devices 16 which has a much greater bandwidth for the transmission of the operating software 38 and other data than a conventional schedule in which transmitting times and message types must be provided both for operating purposes of the motor vehicle 10 and for maintenance purposes. The communication channel enables the control device 32 to communicate with the slave devices 16 via the data input 36 and the bus terminal 18.

Due to the switching capability of the bus master 14 between the two schedules 22, 24, an application mode thus results in the bus master in which application mode the operating schedule 22 is active and by this, messages are exchanged one after the other within short time intervals for normal operation of the slave devices 16 via the bus 12, and a flash mode also results in the bus master for generating a multiplicity of similar messages for transmitting large records such as, for example, of the operating software 38.

The memories 26, 28 can also be provided separately in the motor vehicle 10 outside the bus master 14. It can also be provided that the control device 32 has the memory 28 and transmits the maintenance schedule 24 to the bus master 14 after the control device 32 has been connected to the latter. For switching to the flash mode (maintenance schedule 24 active), the control device 32 can send an explicit command for switching to the switching device 30 via the control interface 34.

On the basis of the maintenance schedule 24, large volumes of data such as the operating software 38 can then be transmitted rapidly via the bus 12 to the slave device 16. Subsequently, it is then possible to switch back into the application mode by the control device 32 from the flash mode into the mode for the transmission of different messages briefly one after the other by a further explicit command for switching. By the switching device 30, it is also possible to measure the time which has elapsed since the switch-over from application mode into flash mode. In the case of a transgression of time and simultaneous inactive communication of the bus master 14, the switching device 30 can then switch independently back into the application mode from the flash mode.

The example shows how a period of time which is necessary for reprogramming a slave device can be shortened in a motor vehicle in that the bus master of the vehicle communication bus has two different schedules for the exchange of messages via the vehicle communication bus. One of the schedules is designed for normal operation whilst the other one is optimized for the exchange of data of, for example, operating software for the slaves.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV,* 69 USPQ2d 1865 (Fed. Cir. 2004).

The invention claimed is:

1. A master bus device for a motor vehicle, to exchange messages with slave bus devices via a vehicle communication bus, the master bus device comprising:
   a first memory to store an operating schedule of the master bus device for exchanging messages with the slave bus devices;
   a second memory to store a maintenance schedule which differs from the operating schedule; and
   a switch-over device to receive a control signal from an external device and, in dependence on the control signal, to switch from the first memory with the operating schedule to the second memory with the maintenance schedule and to specify the maintenance schedule to exchange messages with the slave bus devices,
   the switch-over device being configured to detect a period elapsed since the switch-over to the maintenance schedule and to switch back to the operating schedule if the detected period is greater than a predetermined threshold value, wherein
   the maintenance schedule differs from the operating schedule in at least one of the following respects:
      the maintenance schedule is directed to unidirectional transmission from the master bus device to a particular slave device,
      the maintenance schedule at least predominantly specifies messages for configuring or reconfiguring software of at least one slave bus device, and
      a predominant part or all time slots of the maintenance schedule are used for transmission of software from the master bus device to the particular slave bus device.

2. The master bus device as claimed in claim 1, wherein the master bus device has a receiving device to receive a new maintenance schedule from the external device and to store the received new maintenance schedule in the second memory.

3. The master bus device as claimed in claim 1, wherein the vehicle communication bus is a local interconnect network (LIN) bus, and
   the messages are LIN messages.

4. The master bus device as claimed in claim 1, wherein the switch-over device is designed to switch back to the operating schedule based on a further control signal.

5. The master bus device as claimed in claim 1, wherein the operating schedule and the maintenance schedule each specify a respective transmitting time for each message.

6. The master bus device as claimed in claim 1, wherein
   the operating schedule is configured for normal operation of the motor vehicle,
   in the normal operation, a driver uses the motor vehicle, and
   the operating schedule at least predominantly comprises messages relating to the operation of the motor vehicle during the normal operation.

7. The master bus device as claimed in claim 1, wherein
   the maintenance schedule is configured for a maintenance operation of the motor vehicle,
   in the maintenance operation, at least one maintenance slave bus device is modified for maintenance or further development or manufacture, and
   the maintenance schedule at least predominantly comprises maintenance messages, and
   the maintenance messages transfer data selected from the group consisting of diagnosis data, configuration data and operating software for the at least one maintenance slave bus device.

8. The master bus device as claimed in claim 7, wherein the operating schedule has no time slots reserved for transferring maintenance messages.

9. The master bus device as claimed in claim 1, wherein
   the vehicle communication bus is a local interconnect network (LIN) bus operated according to a LIN protocol,
   the maintenance schedule is configured for a maintenance operation of the motor vehicle,
   in the maintenance operation, a maintenance slave bus device is modified for maintenance or further development or manufacture, during the maintenance operation, a data record received from the external device is transferred to the maintenance slave bus device, and the maintenance schedule specifies that the data record is transferred to the maintenance slave bus device using a transport protocol, which is tunneled through the LIN protocol.

10. The master bus device as claimed in claim 1, wherein the master bus device further comprises a third memory storing at least one further maintenance schedule, and the switch-over device switches over to the third memory in dependence on the control signal.

11. The master bus device according to claim 1, wherein the slave bus devices are selected from the group consisting of sensors, actuators, and window controllers, and the master bus device further comprises a controller which operates the slave bus devices.

12. A master bus device for a motor vehicle, to exchange messages with slave bus devices via a vehicle communication bus, the master bus device comprising:

a first memory to store an operating schedule for exchanging messages with the slave bus devices;

a second memory to store a maintenance schedule which differs from the operating schedule;

a switch-over device to receive a control signal from an external device and, in dependence on the control signal, to switch from the first memory with the operating schedule to the second memory with the maintenance schedule and to specify the maintenance schedule as the schedule used during the exchange of the messages with the slave bus devices; and a receiving device to receive a new maintenance schedule from the external device and to store the received new maintenance schedule in the second memory, wherein the maintenance schedule differs from the operating schedule in at least one of the following respects:

the maintenance schedule is directed to unidirectional transmission from the master bus device to a particular slave device, the maintenance schedule at least predominantly specifies messages for configuring or reconfiguring software of at least one slave bus device, and a predominant part or all time slots of the maintenance schedule are used for transmission of software from the master bus device to the particular slave bus device.

13. The master bus device as claimed in claim 12, wherein the vehicle communication bus is a local interconnect network (LIN) bus, and the messages are LIN messages.

14. The master bus device as claimed in claim 12, wherein the switch-over device is designed to switch back to the operating schedule based on a further control signal.

15. The master bus device as claimed in claim 12, wherein the operating schedule and the maintenance schedule each specify a respective transmitting time for each message.

16. The master bus device as claimed in claim 12, wherein the operating schedule is configured for normal operation of the motor vehicle, in the normal operation, a driver uses the motor vehicle, and the operating schedule at least predominantly comprises messages relating to the operation of the motor vehicle during the normal operation.

17. The master bus device as claimed in claim 12, wherein the maintenance schedule is configured for a maintenance operation of the motor vehicle, in the maintenance operation, at least one maintenance slave bus device is modified for maintenance or further development or manufacture, and the maintenance schedule at least predominantly comprises maintenance messages, and the maintenance messages transfer data selected from the group consisting of diagnosis data, configuration data and operating software for the at least one maintenance slave bus device.

18. The master bus device as claimed in claim 12, wherein the master bus device is configured to receive a record via a data input of the master bus device from the external device, and the maintenance schedule comprises messages to be transmitted by a predetermined transport protocol to at least one of the slave bus devices.

19. The master bus device as claimed in claim 12, wherein the master bus device further comprises a third memory storing at least one further maintenance schedule, and the switch-over device switches over to the third memory in dependence on the control signal.

20. A motor vehicle with the vehicle communication bus to which the master bus device as claimed in claim 1 is connected.

21. A method for operating a master bus device for a vehicle communication bus of a motor vehicle to exchange messages between the master bus device and slave bus devices of the motor vehicle via a vehicle communication bus, comprising:

exchanging messages with the slave bus devices based on an operating schedule during normal operation of the motor vehicle;

receiving a control signal at the master bus device; and changing to a maintenance mode by deactivating the operating schedule and activating a maintenance schedule so that the master bus device exchanges messages with the slave bus devices based on the maintenance schedule, wherein the method includes at least one of:

detecting a period elapsed since the maintenance schedule has been activated and switching back to activate the operating schedule and to deactivate the maintenance schedule if the detected period is greater than a predetermined threshold value; and receiving a new maintenance schedule from the external device and storing the received new maintenance schedule, wherein the maintenance schedule differs from the operating schedule in at least one of the following respects:

the maintenance schedule is directed to unidirectional transmission from the master bus device to a particular slave device, the maintenance schedule at least predominantly specifies messages for configuring or reconfiguring software of at least one slave bus device, and a predominant part or all time slots of the maintenance schedule are used for transmission of software from the master bus device to the particular slave bus device.

* * * * *